United States Patent [19]

Bachmann et al.

[11] Patent Number: 4,476,173
[45] Date of Patent: Oct. 9, 1984

[54] JOINT OF TEXTILE MATERIALS

[75] Inventors: Albert Bachmann; Moritz Wälti, both of Mels; Gottlieb Benz, Flums, all of Switzerland

[73] Assignee: Quikoton AG, Switzerland

[21] Appl. No.: 368,731

[22] Filed: Apr. 15, 1982

[30] Foreign Application Priority Data

Apr. 16, 1981 [CH] Switzerland .......................... 2551/81
Apr. 16, 1981 [CH] Switzerland .......................... 2552/81

[51] Int. Cl.³ .............................................. B32B 3/00
[52] U.S. Cl. ........................................ 428/57; 156/179;
156/181; 156/436; 428/61; 428/292; 428/293;
428/294; 428/298; 428/284; 428/102
[58] Field of Search ................. 428/57, 59, 61, 294,
428/298, 292, 293, 295, 102; 156/181, 436, 179

[56] References Cited

U.S. PATENT DOCUMENTS

| | | | |
|---|---|---|---|
| 2,108,188 | 6/1936 | Batchelder | 8/5 |
| 2,675,601 | 4/1954 | Still | 28/103 |
| 2,982,001 | 5/1961 | O'Shields | 28/103 |
| 4,090,902 | 5/1978 | Ferrentino et al. | 156/179 |
| 4,118,183 | 10/1978 | Godau et al. | 8/18 R |
| 4,131,502 | 12/1978 | Mitra | 156/179 |
| 4,198,735 | 4/1980 | Chambley et al. | 28/103 |

Primary Examiner—James J. Bell
Attorney, Agent, or Firm—Ostrolenk, Faber, Gerb & Soffen

[57] ABSTRACT

A joint between two textile materials in web form, one of them preferably being a plurality of parallel yarns forming a monolayer or multilayer sheet, and the other one a fabric. The joint is an adhesive or heat sealed bonding member which is equipped at least on one of its surfaces with a heat shield. The joint is flexible, thin, tear and heat resistant, not attacked by chemical reagents, solvents or vapors. It can be formed in a novel apparatus for heat sealing by means of heat sealable strips which are reinforced by heat resistant materials and which are heat sealed together across the yarn sheet.

14 Claims, 7 Drawing Figures

JOINT OF TEXTILE MATERIALS

This invention relates to joints of textile materials, especially textile webs, to facilitate and improve textile processing. It further relates to a new and improved method for forming such joints, and furthermore to a new and useful apparatus for performing said joint forming method. In still other aspects, this invention is related to a warp yarn treating and processing method and machine wherein lengths of warp yarns are joined together or to a fabric by means of the joint according to the invention.

BACKGROUND OF THE INVENTION

It is well known that the joining of textile materials is a frequent step in the textile industry. This applies particularly to continuous processing of textile webs, where textile webs must be joined to one another. In continuous or semi-continuous methods, the webs which have been processed are not completely pulled out of the machine but a new, fresh web is joined to the web end. In this manner, the processing machine is not run without any web therein which would create serious and very complicated problems including a standstill and a thorough cleaning of the machine and the tedious draw-in of the new web.

Throughout the present specification and claims, the expression "textile web" or "textile material" signifies any fibrous material which is linearly bidimensional, i.e. wherein the thickness of the material has a very small value compared with the breadth and, much more, with the length of the material. A typical range of the relative thickness: breadth (width): length is about 1:100–2500:1000–2,500,000. Such textile webs may be woven or non-woven fabrics, fleeces, knitted materials, and also monolayer or multilayer webs formed by parallel, sheet-like arrangements of yarns such as warp yarns.

The processing methods and apparatus for textile webs are well known to the man skilled in the art. Such kinds of processing methods are, e.g., the washing, gassing, dressing, bleaching, dyeing, printing, livening, finishing etc. Yarn sheets are generally sized and dyed.

Since it is known how to process sheets of parallel yarns in great working widths and since the uniform tension in all such individual yarns can be better maintained due to better yarn quality, the general trend is to use the yarns instead of the finished fabric for all processing operations as far as this is useful and reasonable in view of any further process steps. Thus, one would try to perform cleaning, bleaching, washing, shrinking, swelling, dyeing (especially vat dyeing), optical brightening, livening, softening, hydrophobing, flameproofing, shrinkproofing and, of course, sizing on said sheets of parallel yarns. Such methods are disclosed in Swiss patent No. 612,557 and French patent No. 1,201,724.

The hitherto known methods in this field suffer from serious difficulties. In fact, it is complicated and time-consuming to draw the yarns into the processing machine or into the set of machines arranged in series for the first time and when fresh yarns must be drawn in, to replace the feed. It must be taken into account that the number of parallel yarns in these machines is very high and amounts in most cases to from 7,000 to 10,000. The length to be drawn in can reach considerable values, of 350 meters or more.

This difficulty does not exist to the same extent in fabrics. In this case, the leading end of the new fabric is simply joined to the trailing end of the fabric under treatment by one or more transverse seams which can rapidly be made with a stand-by hand sewing machine.

Tests have shown that this solution cannot be used with textile materials which unravel in longitudinal direction (thus in the direction of drawing) like fleeces and, especially parallel yarns. Therefore, other possibilities for joining yarns in the lengthwise direction have been considered.

One possibility would be to knot each of the fresh yarns to be drawn into the machine to each one of the yarns already in the machine. But this kind of joint would be impossible to be made in practice, even if a knotting machine were available, in view of the time delay. Furthermore, it has been proposed to join both sets of yarns by a clamp bar applied transversally over both yarn sheets to be joined. This temporary joint has the drawback that its pulling speed through the machine would be insufficient. Besides, a clamp bar would be too bulky to be drawn through such machines.

The inventors had first considered to resolve the problem of forming a joint between such textile materials by introducing an intermediate joining element in the form of a fabric between the two yarn groups to be joined. This intermediate element would be affixed to the trailing and of the yarns under processing and would be drawn through the machine. Then, the leading ends of the fresh yarns would be fixed the trailing end of the intermediate fabric, and the fresh yarns could be introduced into the machine when said intermediate fabric is pulled out of the machine. However, there were no means or devices available to fix a sheet composed by thousands of parallel yarns in a satisfactory manner to a fabric having substantially the same width as said sheet.

BRIEF DESCRIPTION OF THE INVENTION

Accordingly, it is an object of the present invention to provide a strong joint, especially of high tensile strength, between two textile materials, in particular between a sheet formed of a plurality of parallel yarns, and a fabric or another such sheet of yarns, said tensile strength having about the same value as that of the yarns and said fabric. It is another object of the invention to provide such a joint which is resistant to chemical reactants treatment baths and other chemical environments, such as solvent vapours. A further object of the invention is to provide a joint of the above defined purpose which would be flexible to follow small radii of rollers within a processing machine. The joint must have all the good properties of a perfect transversal seam.

A still further object of the invention is to provide a joint which is heat resistant so that it will not open when it is drawn by appreciable forces over heated dryer rollers or through a drying oven.

Furthermore, it is an object of this invention to provide a method, adapted to and being capable of forming such joints with the best reliability, in a rapid and effective manner, wherein said process would not have to use expensive or hazardous auxiliary agents.

A further object of this invention is to provide an apparatus for forming said joint and being designed for best carrying out the method for forming said joint.

Other objects of the present invention are a machine for processing a sheet or several superimposed sheets formed by a plurality of parallel yarns, comprising an apparatus for forming a strong joint between a trailing end of said sheet or sheets and the leading end of another textile web, be it a fabric or another sheet or other sheets formed by a plurality of parallel yarns.

Still other objects of this invention will become evident from the following specification and explanation and from the description of special and preferred embodiments of this invention.

Briefly discribed, the invention provides a tear resistant, heat resistant, chemical or corrosion resistant joint between two textile materials, in particular between at least one sheet formed of a plurality of parallel yarns and a fabric or another such sheet or sheets, said joint having an acceptable thickness, capable of being rapidly formed and maintaining said yarns in their original parallel relationship and being characterized that it comprises an adhesive or heat sealed bonding member, at least the one surface of which is subjected to thermal stress during use being shielded by a heat rejecting layer.

Although adhesive bonding is a joining method known per se, the prior art could not anticipate the invention since up to now, the bonding of parallel yarns with fabrics or with another group of parallel yarns has not been reported or suggested. The man skilled in the textile art would have looked for joining procedures which were analoguous or related to sewing. Furthermore, the mere adhesive bonding or heat sealing could not solve the problem without inventive development by adapting the technique to the requirements for providing a joint having all necessary properties as described above, especially tear, heat, solvent and corrosion resistance, flexibility, uniformity and short time requirements. The additional idea had then to be found to provide the joint with a thermal shield which further improves mechanical resistance.

The bonding agents which can be used to bring about the necessary properties of the joint in acceptably short times preferably contact adhesives based on neoprene, cyanoacrylates, cyanomethacrylates etc. Normal adhesives such as certain polymers dissolved in solvents like ethyl acetate can generally not be used nor can be water soluble adhesives. The utilisation of the heat sealing method is highly preferred in the present invention. This method implies the use of a bonding element comprising a thin sheet of fabric, plastic foil and the like which is coated on one of its surfaces with a heat sealing adhesive. The other surface is reinforced with fabric, glass fibers, metal nets, metal sheets or others. Such joints are flexible, very tear and thermal resistant and can be formed in short times.

In all cases, a further principal requirement of the bonding agent is its good wettability by the fibers of the textile materials to be joined; otherwise, the tensile strength of the joint will not be sufficient.

Although the heat sealing is the preferred method for forming the joint of the invention, the explanations in this specification refer accordingly to to "cold" adhesive bonding wherein, however, an additional thermal shield must be provided.

The joint of the invention can be realized in very different manners. In a first embodiment, the trailing end of the yarn sheet is adhesively bonded between two identical or different sheets of other material or heat sealed therewith, the leading end of the fabric being sewn to said sheets. Secondly, it is also possible to stick or heat seal the leading end of the fabric to the joint. In a third embodiment, heat sealing adhesive can be coated on the final region of the fabric, and the latter will form one component of the joint.

A highly preferred component of the joint according to the invention is a thermoplastic sheet, coated with a heat sealing adhesive and reinforced on the backside with a fabric, sold under the trade name "Habasit" by the company Habasit in Reinach, Basel-Land, Switzerland. This sheet will normally be used as two constituents, namely on both sides of the joint (upper and lower side); however, it will be possible to replace one of said sheets by another one coated with the heat seal adhesive, in the form of papers, fleece, fabric etc.

An important feature of the invention is that the bonding site is protected, at least on one of its two surfaces, by the thermal shield already described. This shield is necessary since the great majority of processing machines for textile materials are equipped with heating cylinders over which the joint must be guided. The heat rejecting or absorbing layer must be such that the opening of the joint due to thermal stress is substantially retarded, at least as long as the bonding site is subject to heat. The thermal shield may be a fabric or a fleece made from polyester, nylon, glass fibers or metallic fibers, or may be a thin sheet of these materials. These examples should not limit the choice of matter with which the one skilled in the art is familiar.

BRIEF DESCRIPTION OF THE DRAWING

In order that the manner in which the foregoing and other objects are attained in accordance with the invention can be understood in detail, certain advantageous embodiments thereof will be described, by way of example only and not construed to limit this invention, with reference to the accompanying drawings wherein:

FIG. 2 shows schematically three steps of a method to form the joint of FIG. 1a;

Figure 1A:
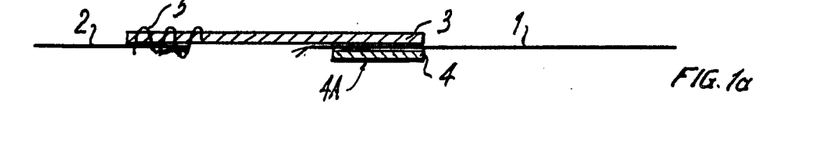
FIG. 1a and 1b are schematical sectional views of two embodiments of the joint according to the invention, the section having been made in the longitudinal axis of textile webs.

In the drawing figures, identical or similar parts are designed by the same reference numerals if not otherwise indicated. Referring now to FIG. 1a, the trailing ends of a plurality of parallel yarns or threads forming one or more superimposed sheets or layers, is designed 1. The number of yarns is very high and and normally amounts to between 7,000 and 10,000, typically 8,000. This trailing end region is sealed, cemented or welded between two strips 3 and 4. Strip 3 is a sheet made from an appropriate plastic material which had been coated, before the forming of the joint, with a layer of a heat sealable composition. Instead of this composition, the layer may comprise a contact adhesive composition. The strip 3 may be reinforced on its upper surface by a fibrous layer or a reinforcement sheet (not shown).

The lower strip 4 may be the same material as strip 3 and may thus be identical to the latter, with the exception that the upper surface of strip 4 is coated with the adhesive composition and the lower surface thereof comprises the reinforcing layer 4A.

The upper strip 3 is broader than strip 4, i.e. in the section of FIG. 1a, its lengthwise shown dimension is greater that of strip 4. A fabric 2 which extends infinitely to the left, is sewn by the schematically shown seam 5 to strip 3. The seam may comprise several adjacent or zigzag seams. (This seam does not belong to the invention.)

Figure 1B:
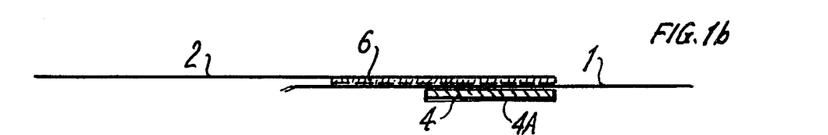

A second embodiment of the invention is shown in FIG. 1b. In this embodiment, the fabric 2 had been coated with a heat sealable composition 6 before the forming of the joint. Such heat sealable adhesives are known per se and can be purchased in form of powders, dispersions or solutions, see M. Peter, Grundlagen der Textilveredlung, Dr. Spöhr Verlag, Stuttgart 1970, p. 403, and the handbooks of plastic processing.

Figure 2:
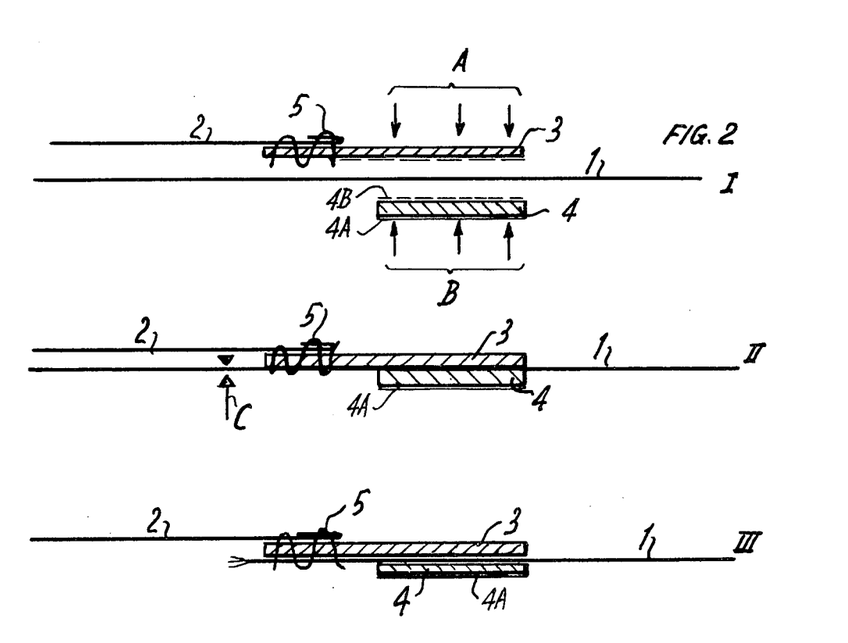

FIG. 2 shows schematically three steps (I,II,III) of the method to form the joint of FIG. 1a. The yarn sheet or sheets 1 are held straight between a flexible strip 4, preferably made of a plastic material, which has on its upper surface a coating 4B of a heat sealable composition and which is reinforced on its backside by a reinforcing layer 4A as described above, and another flexible strip 3 having the same properties but not necessarily comprising a reinforcing layer. The strip 3 is preferably broader than strip 4, and that portion thereof which extends further than strip 4 is fixed to a fabric 2 by means of one or more seams 5 as explained above. Now, heat and pressure is applied in the direction of arrows A and B, along certain lines or on the whole surface or on parts thereof until the facing heat sealable layers of strips 3 and 4 will have formed a bonding or joint which traverses and clamps the yarn sheet or sheets 1.

The heat to be applied must be such that the joint is formed within reasonable time limits, generally comprised between 1 and 20 seconds. The temperature of the heat source (not shown) must however not too high so that the flexible strips 3 and 4 do not undergo damage or become hard.

The heat sealing adhesive must wet the yarns in the semi-liquid state during the heat sealing step. It must, however, be inert enough as to avoid a dissolution of the yarns, and it must have a fusion or softening temperature well below of the melting point of the yarn fibers. When the heat sealing or welding site has cooled, one obtains the desired joint which has outstanding tensile strength properties (step II in FIG. 2). Now, the yarn sheet 1 is cut behind the bonding site (see arrow C in FIG. 2-II). The final form of the joint is shown in FIG. 2-III.

In the depicted method, the webs 1 and 2 can take any spatial direction whatsoever provided that they are appropriately extended.

The heat sealing operation itself has not been described in all details since this technique is known per se and is described in the literature.

Figure 3A:
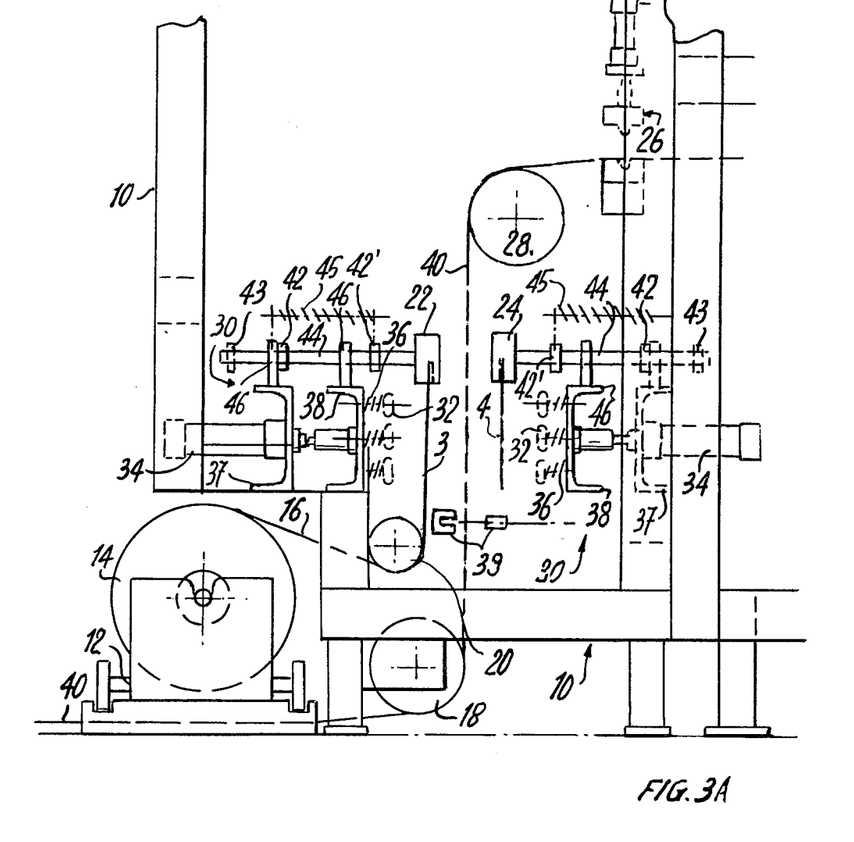
FIG. 3A is a side elevation of an apparatus for performing the method of the invention.

FIG. 3A shows in schematical side elevation an apparatus particularly suited for forming the described joint. The apparatus is for example used to join the trailing end of parallel yarns which form a monolayer or multilayer sheet, with the leading end of an auxiliary fabric which serves as an intermediate element for introducing fresh yarn.

The apparatus is mounted within a machine frame 10 whose lower part has a location space for receiving a fabric reel carriage 12 which carries a supply of fabric 16 wound on a reel 14. The frame 10 further carries deflection rollers 18 and 20 which are free running or can be driven by means which are not shown, and horizontally movable clamping devices 22 and 24, a vertical clamping device 26, a third deflection roller 28, two horizontally slidable welding devices 30, 30' comprising welding heads 32 and hydraulic motors 34, and a cutter device 39. The welding heads are horizontally movable with respect to their supporting bars 38 against the force of compression springs 36. The horizontal clamping devices 22 and 24 are also in turn horizontally slidable, and they can be moved when the supporting bars 38 are displaced, as will be described later. The clamping devices 22 and 24 are fixed to the ends of horizontal rods 44 which are slidable journalled in brackets 46; the movement of the rods 44 is limited by adjustable stop collets 42, 43 and 47 as will be shown later. A second pair of rear support bars 37 is provided for ascertain a horizontal and parallel movement of the rods 46. Draw springs 45 are provided which are connected to the rear supporting brackets 46 and the front stop collets 47.

The control devices, lines and conducts, power connections and other means for providing controlled and desired operations and movements are known to the man skilled in the art and are not represented for sake of clarity of the drawing. The steps and their sequence to be described now are preferable carried out according to a program which is stored and executed by suitable electronic, mechanical and/or hydraulic means known per se.

The device which has been described works as follows:

A sheet of parallel yarns 40 which has been formed by drawing from yarn beams (not shown) passes under the carriage 12 and enters the device from below. The sheet is caused to travel vertically upwards by the deflection roller 18 and afterwards substantially horizontally by the second deflection roller 28 to the right. It leaves then the field of the drawing (FIG. 3A) to be processed in a manner which has already been mentioned.

On its way as described, the yarn sheet traverses cooperating elements of the apparatus such as the cutting device 39, the clamping device 26 and the sealing devices 30 and 30'. All these devices are in their inoperative or open position, respectively.

A length 16 of fabric has been unwound from the fabric supply 14 which has been deflected upwardly by the roller 20 and extends toward the clamping device 22. The web 16 is under tension since the unwinding had been done against the force of a reel brake (not shown) on the shaft of the reel 14. The leading end of fabric 16 has been sewn to a heat sealable strip 3, as described above, and this strip 3 is clamped into the clamping device 22.

Facing strip 3 on the other side of the running yarn sheet 40 (which corresponds to sheet 1 in FIG. 1 and 2, see the description of these figures), a second heat sealable strip 4 is pending downwardly from the clamping device 24 where it is clamped. Both strips 3 and 4 are made of Habasit, a material described above.

When the joint of the invention is to be formed, e.g. when the yarn sheet 40 is to be expected to come to an end, the advance of the yarn sheet 40 is stopped and the clamping device 26 is actioned as to hold the yarn sheet 40 clamped between its brackets. The yarn sheet 40 remains under tension by the natural unwinding resistance of the yarn beams (not shown) or by other frictional means. Now, the hydraulic cylinders 34 which are rigidly mounted on the supporting bars 37 are activated. The pistons of the cylinders 34 push the movable supporting bars 38 forward, together with the welding heads 32 mounted thereon, until these heads come in contact with the strips 3 or 4, respectively. At about this position, the front brackets 46 mounted on the movable supporting bars 38 come in contact with the front collars 47 on the clamping device rods 44 and begin to push therefore the clamping devices 22 and 24 also in direction to the vertically maintained yarn sheet 40, until the strips 3 and 4 as well as the clamping devices 22 and 24—whose movement is achieved against the force of draw springs 45 which are now extended—will touch the yarn sheet. The travel distances of the clamping devices and the welding heads are selected and adjusted such that, when the clamping devices 22 and 24 and the strips 3 and 4 are in contact with the yarn sheet, the compression springs 36 of all welding heads 32 are under tension so that the welding heads are applied with a certain force against strips 3 and 4, and of course in opposite direction. Stop collars 43 prevent the rods 44 from running out of their brackets 46 and stop the movement of the rods when the opposite welding head does not make the same movement.

During their contact with the strips 3 and 4, respectively, the welding heads 32 which are hot transfer heat and pressure on said strips which heat seal together across the yarn sheet 40. When the heat seal is achieved, the hydraulic cylinders 34 are actioned in the opposite direction, and as soon as the retracting welding heads 32 are no longer in contact with the strips 3 and 4, the clamping devices 22 and 24 are opened and liberate the upper ends of strips 3 and 4. During the retracting movement of the support bars 38, the clamping devices 22 and 24 are also retracted, namely by the elastic force of the springs 45, until the stop collars 42 abut against the rear slide bracket 46. Further rearward movement of the support bars 36 will only result in a sliding of front brackets 46 on the rods 44 so that the clamping devices 22 and 24 remain in their position defined by the abutment of stop collars 42 against rear bracket 46. Should the clamping devices stick to the yarn sheet, or should the force of the springs 45 not be sufficient, the retracting movement of the devices is accomplished by a rearward abutment of rear stop collars 43 to the rear brackets 46.

During the rearward movement of the supporting bars 38, the joint begins to cool. When the joint has reached a temperature where its tensile strength is already sufficient, the cutter device 39 will cut the yarn sheet 40. The upper clamping device 26 will now be opened, and the fabric web 16 which is now strongly joined to the upstream portion of the yarn sheet 40 can follow when said upstream portion advances through the apparatus.

The welding heads 32 are supplied with power in such a manner that they are able to preheat the strips 3 and 4 already before the described formation of the joint so that the real heat sealing time requirement is shortened. This preheating action can of course be controlled not only by the temperature and radiation properties of the welding heads but also by their distance from the strips during the stand-by period.

It has been found that all steps of the described method can be achieved in not more than 15 to 20 seconds. The heat sealing can be done in about 5 to 15 seconds, the cooling in 3 to 8 seconds, and the cutting off in 2 seconds. Additional cooling means like vans (not shown) can be used.

The man skilled in the art may of course adapt the method and devices to special requirements. These variations and adaptions might be appropiate according to the nature of the yarns and the fabric web, the heat sealing strips and composition used, etc.

It should be noted that the textile materials to be joined by the joint of the invention generally have the same width.

The new joint between similar or different textile materials makes it possible to develop a new method and machine capable of processing a plurality of parallel extending yarns which are arranged in one or more superimposed sheets, in a uniform manner and substantially processing these yarns under the same conditions as the bulk until substantially their end. This method is characterized in that the trailing end portion of said yarn sheet or sheets is withheld, a textile web is fixed to said trailing end portion by means of the new joint explained above, the advance of the yarn sheets is liberated and a length of said fabric is drawn into the machine, and the speed of the yarn sheets during processing is maintained within the machine during the time of withholding the trailing end region of the yarn sheets and the forming of said joint by emptying at least partially a yarn sheet accumulator.

The machines with which this method can be carried out are the normal yarn processing machines as outlined above, but processes where a fabric web has used until now, can also be applied to yarn sheets because the new joint makes possible a higher effectiveness and yield of the methods. These new machines will comprise the above described joint forming apparatus with its auxiliary elements as a component.

In order to join the auxiliary fabric web to the trailing end of the yarn sheet or sheets, one such apparatus will suffice when there are only one or few yarn sheets. However, when the process machine is processing a yarn arrangement formed in several or plurality of layers, it can be necessary to provide more than one joint forming apparatus.

Figure 3B:
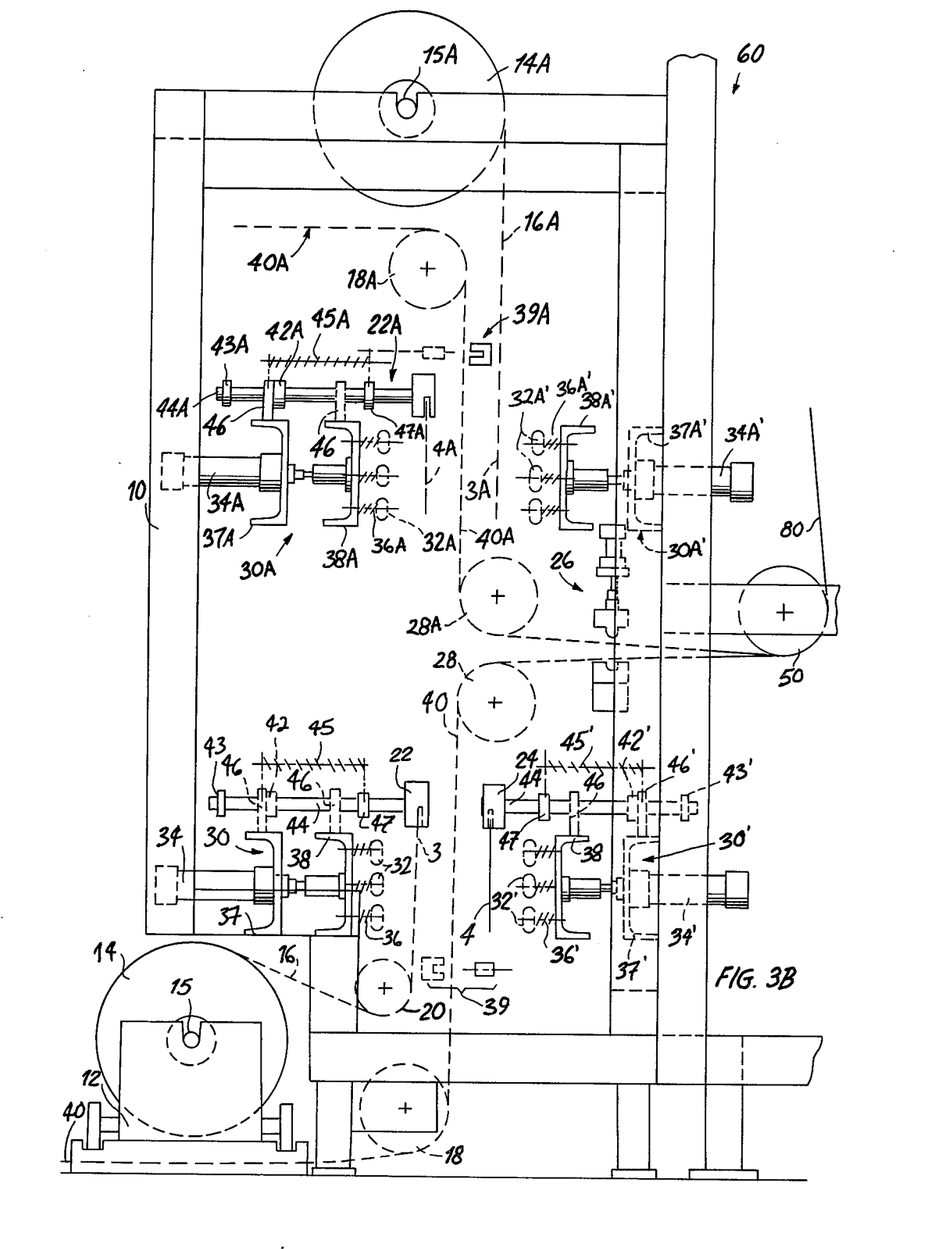
FIG. 3B is a side elevation of the rear end of a yarn processing machine equipped with the apparatus of FIG. 3A.

This aspect of the invention is illustrated in FIG. 3B. As can immediately be seen by comparison with FIG. 3A, the machine represented in FIG. 3B comprises firstly the device of FIG. 3A in its lower part, and a second analoguous device in its upper part.

In FIG. 3B, two sheets formed of a plurality of parallel yarns are shown, which are substantially identical and which are combined within the processing machine which will thus process a plurality of parallel yarns in the form of a sheet made up of two layers which have been combined. The first yarn layer 40 enters the machine at the bottom thereof, is deflected by rollers 18 and 28 and then directed to the combination roller 50. Another yarn layer 40A enters the machine at its top, is twice deflected by rollers 18A and 28A, and is also directed to the combination roller 50. The combined sheet 80 formed thereon is fed into the processing machine which is not shown since it may be any conventional or novel yarn processing machine adapted for carrying out any one of the processes already described above in detail.

The joint forming station now to be described is composed of two sections, a lower section which generally extends between the lowermost parts of the station, namely the entering yarn web 40, and the middle part thereof, about in the horizontal axis of the clamping device 26, and an upper section above said horizontal axis. In the lower section, a fabric web 16 is joined by the joint of the invention to the lower yarn sheet 40, and in the upper section, the same is done with the upper yarn sheet 40A.

Both sections comprise analoguous elements and devices which are generally arranged in mirror-inverted positions. These analoguous or similar elements are designed in the following manner:

(1) Lower section, left-hand part: plain reference numerals;

(2) Lower section, right-hand part: same but primed reference numerals;

(3) Upper section, left-hand part: same reference numerals as under (1) but A added;

(4) Upper section, right-hand part: same as (3) but primed.

The construction, layout and function of the lower section has already been described in detail above, with reference to FIG. 3A, and this description need not be repeated. We will now describe the upper section of the joint forming station shown in FIG. 3B which is slightly different since the yarn sheet 40A, in its vertical path, does not travel upwardly but downwardly.

It should be noted that both sections of the joint forming station are working in a simultaneous, synchronized manner so that both yarn sheets 40 and 40A are treated at the same time and undergo the same treatments.

The upper part of the frame 10 receives a second fabric web reel 14A equipped with a brake 15A. The auxiliary web 16A is wound on the reel 14A. No deflector roll nor clamping device are necessary to hold the free leading end of the web 16A which freely depends downwardly from the supply 14A. However, since the diameter of the reel 14A may change and the free end of the web 16A to which is already fixed the heat sealable strip 3A by a seam, may float in the machine, such element may be provided.

The second heat sealable strip 4A hangs down from a clamping device 22A which is constructed in full analogy to the lower clamping device 22 whose description is here referred to. The same applies to the cutter device 39A. The major difference between the upper and lower sections is that the first heat sealable strip 3 is in front of the yarn layer 40 and the second strip 4 behind it in the lower section whereas these two strips have their positions changed in the upper section; this is due to the mode of introduction of the auxiliary web 16A.

From the combination and deflection roller 50, already described above, the combined yarn sheets 80 enter a web accumulator 60 (now shown). The accumulators are known apparatus serving to accumulate a considerable length of web between a plurality of pairs of distanced rollers which can be approached one to another so that the cumulated web length decreases. However, accumulators have not yet been used for yarn sheet processing machines.

The machine comprising the joint forming station, the accumulator and the yarn sheet processing section (only the joint forming station is shown) works as follows:

First, the joint forming strips and the auxiliary webs 16, 16A are prepared and fixed in the clamping devices 22, 24 and 22A as already described. Then, the two yarn sheets 40, 40A are fed into the joint forming station, the accumulator and the processing section as usual, either directly or drawn by an auxiliary fabric, the accumulator (which may contain between 20 and 200 m of web material) is filled, and the processing section is put into action so that the yarn sheet 80 is processed as desired.

Now comes the moment where the yarn sheets 40 and 40A come to an end since the spools on the warping frame empty. At this moment, the clamping device 26 is energized, clamping both yarn sheets 40 and 40A between its jaws. The heat seal joints are now formed as already described in detail above, the sealing heads 32 co-acting with the sealing heads 32' in the lower section and sealing heads 32A together with heads 32A' in the upper section. The heads are then reversed and retracted; when the joints have cooled to a temperature where the necessary tensile strength is reached, the cutter device 39 and 39A cut off the ends of the yarn sheets.

Since, as already mentioned, the forming steps of the joints until attaining the necessary tensile strength lasts only at most 20 seconds, an accumulator 60 having a capacity of, say, 20 m is then still about half full when the processing speed in the processing section amounts to about 30 m/min. According to the invention, the accumulator is now complety emptied, and then the clamping device 26 is opened and the two fabric webs 16, 16A joined to the trailing ends of the yarn sheets 40, 40A are fed into the accumulator which is kept in the minimum capacity state since the object of the invention is not to fill the accumulator with auxiliary fabric but only with yarn sheet so that the yarn can be processed until it is at an end.

Now, the process is continued with the normal process speed until the two fabric webs 16, 16A appear at the end of the machine. This is possible since the joints which have been formed can pass all critical points of the processing machine such as heaters, drying rollers, nips, gaps, baths etc. since this joint is flat, flexible, thin, heat and tear resistant and resistant against chemical attack. In this way, the invention saves about 300 to 350 m of 10,000 yarns per 3000 to 5000 m, which is the normal length of yarn on spools.

Then, the machine is stopped, and fresh yarns are fixed to the trailing ends of the auxiliary fabrics 16, 16A introduced into the machine, and this will preferably be done by means of the joints of the invention, as described.

Figure 4:
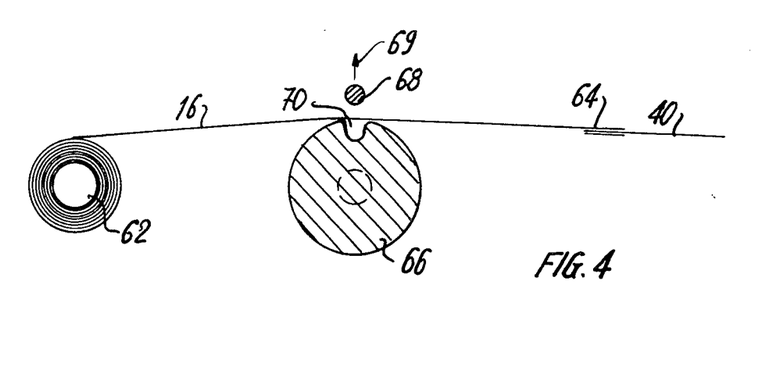
FIG. 4 is a sectional view of an auxiliary apparatus of the machine shown in FIG. 3B, and FIG. 5 a sectional view similar to that of FIG. 4 but in another functional position.
Figure 5:
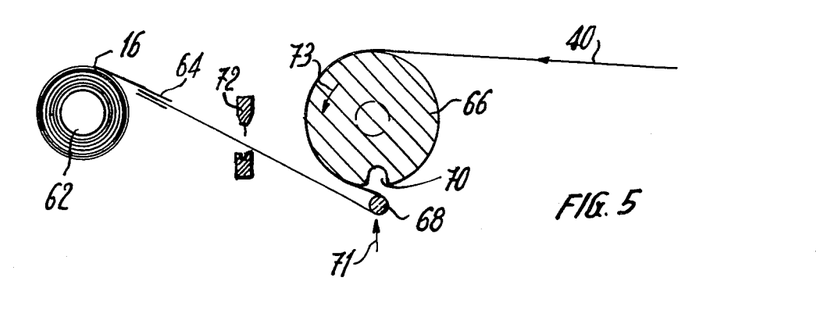

FIG. 4 and 5 show a preferred embodiment of an auxiliary take-up device for the restarting phase of the described machine. The problem is that in the starting phase of the described machine, until steadystate is reached, the fabrics which have been introduced are used, and the machine can of course not be stopped when the leading portion of processed fresh yarn appears at the end of the machine. This fresh yarn should be taken up on another reel.

The machine is started, and the auxiliary fabric web 16 is wound on the mandrel 62. In this step, the web 16 goes between a yarn beam core 66 and a clamping bar 68 held at a distance above the core 66 and facing a tapered groove 70 adapted to receive the bar 68. A not shown lever system connects the bar 68 to the core 66. Now, a joint 64 trailing a fresh yarn sheet 40 behind is approaching. When an appropriate detector device (not shown) detects that the joint 64 has passed the gap between the clamping bar 68 and the core 66 and is approaching the reel 62, the yarn beam core 66 is rotated in the direction of the arrow 73 (FIG. 5). Since the clamping bar rotates with the same angular speed, some web is unwound from the reel 62 which is equipped with an appropriate friction clutch or sliding drive device (not shown). After about half a turn of the core 66, the yarn sheet which begins to be wound on the latter starts to exert a radial force to the bar 68 (arrow 71 in FIG. 5) so that the bar is urged into its groove 70 where it is held by frictional forces, clamping at the same time the yarn sheet 40. This yarn is then normally wound on the core 66 after a cutter 72 has cut off the end of the yarn sheet fixed to the auxiliary web 16. Then, the accumulator 60 will gradually be filled with yarn sheet until the normal state of the machine is reached as described above.

As will be readily apparent, the joint of the invention allows solving the problems hitherto encountered with yarn processing methods and machines, it saves time, money and material and permits a better efficiency and yield of textile methods and products. It promotes the yarn treating methods.

While certain advantageous embodiments have been chosen to illustrate the invention, it will be understood by those skilled in the art that various changes and modifications can be made therein without departing from the scope of the invention which is defined in the appended claims.

In particular, not only fabrics can be joined with yarn sheets, but also fabrics can be joined with fabrics, and, expecially, yarn sheets can be joined with yarn sheets.

What is claimed is:

1. A tear, heat and corrosion resistant flexible joint between textile materials, especially between at least one sheet formed of a plurality of parallel yarns and another textile material, characterized by the fact that the joint comprises an adhesive bonding member, at least the surface of which that is subjected to thermal stress during use being shielded by a layer which rejects heat or absorbs heat.

2. The joint according to claim 1, characterized by the adhesive bonding member being a heat sealing bonding member.

3. The joint according to claim 1 or 2, characterized by the textile material joined to said yarn sheet, is a fabric.

4. The joint according to claim 3, characterized by the fabric fixed to a first strip of a thermoplastic, heat sealable sheet thermally shielded by a fibrous layer or a fabric, that said first strip is heat sealed at its free other end region to a second strip of a flat material, and that said yarn sheet is heat sealed between said first and second strips.

5. The joint of claim 3, characterized by the fabric is coated with a heat sealable adhesive and is heat sealed through said yarn sheet to a strip of a flat and flexible heat sealable material.

6. The joint of claim 1 or 2, characterized by joining two sheets formed of a plurality of parallel yarns.

7. The joint according to claim 1, characterized in that said adhesive bonding member is a contact adhesive member.

8. The joint according to claim 1, characterized in that the joint comprises a thermoplastic sheet coated on one side with a heat sealing adhesive and reinforced on the other side with a fabric.

9. The joint according to claim 8, characterized in that the sheet is formed of between 7,000 and 10,000 parallel yarns.

10. The joint according to claim 1, characterized in that the sheet is formed of between 7,000 and 10,000 parallel yarns.

11. A method for forming the joint of claim 4, comprising the following steps:
  (i) holding at least one sheet formed by a plurality of parallel yarns between a first strip of a weldable or heat sealable thermoplastic material, which is fixed to a fabric, and a second weldable or heat sealable strip, in such a manner that the planes formed by both said strips and said sheet of yarns are substantial parallel,
  (ii) bringing into contact said first and second strips with said yarn sheet, and
  (iii) joining said both strips by heat induced welding or sealing,
thus clamping said yarn sheet or sheets between said two strips by welding or sealing action.

12. The method of claim 11, characterized by the fact that both strips being pre-heated before bringing them into contact with each other.

13. A method for forming the joint of claim 1 comprising the step of contacting a sheet formed by a plurality of parallel yarns with an adhesive bonding member as least the surface of which that is subjected to thermal stress during use being shielded by a layer which rejects heat or adsorbs heat, so as to bond said member to said sheet.

14. The method of claim 13, characterized in that the shielded adhesive bonding member is a thermoplastic sheet coated on one side with a heat sealing adhesive and reinforced on the other side with a fabric.

* * * * *